Patented Apr. 8, 1941

2,237,980

UNITED STATES PATENT OFFICE 2,237,980

MANUFACTURE OF OPTICALLY ACTIVE MENTHONES AND MENTHOLS

John William Blagden and Walter Edward Huggett, Ilford, England

No Drawing. Application May 20, 1939, Serial No. 274,833. In Great Britain May 26, 1938

20 Claims. (Cl. 260—587)

This invention relates to the catalytic hydrogenation of laevo-piperitone to produce menthones or menthols of full or very high optical activity.

We have found that the catalytic hydrogenation of laevo-piperitone by the usual methods leads to products which are either optically inactive or are of low optical activity owing to complete or partial racemisation which occurs during the hydrogenation to the menthone stage. Thus the hydrogenation of laevo-piperitone in presence of palladium (introduced in the form of palladium chloride) is found to yield a mixture of menthones which are racemised to the extent of 50 per cent. Hydrogenation in presence of a nickel or nickel-copper catalyst containing magnesium as a promoter is found to yield ultimately a menthol mixture having only 65 per cent. of the theoretical optical activity.

This invention relates to a process for the catalytic hydrogenation of laevo-piperitone in which racemisation is entirely prevented or greatly reduced during hydrogenation by the choice of suitable conditions for the hydrogenation.

One condition which tends to counteract racemisation during hydrogenation is the use of a catalyst fulfilling the following conditions:

(a) It must not be appreciably basic or acidic, that is to say, when extracted with water it must not impart to the water an appreciable basic or acidic reaction; the extract water should show a pH value which is between 5.0 and 10.0 and preferably is between 7.0 and 8.0; and (b) It must not develop an appreciable basic or acidic reaction during the hydrogenation.

In particular, the catalyst should be free from even traces of free alkali. We have found that metal catalysts prepared by reduction from the precipitated metal carbonates invariably contain some free alkali. Catalysts suitable for use in the invention, however, can be prepared from the metal carbonate by first converting the carbonate into the oxide by heat and then washing the oxide with water until it is free from traces of caustic alkali and the washings have a pH value within the limits above indicated. The presence of magnesium in small proportion (up to, say, about 5 per cent.) in the catalyst is not harmful.

Another condition which tends to avoid racemisation is the use of a hydrogenation temperature below about 140° C.

A further condition which counteracts racemisation during the hydrogenation of piperitone to menthones is the use of a suitable organic solvent for the hydrogenation. Suitable solvents are those containing oxygen and having a dielectric constant of at least about 15, for example, methyl alcohol, ethyl alcohol and ethylene glycol. The use of such a solvent is not essential in all cases but nevertheless constitutes a desirable additional precaution. Such solvents, however, tend to prevent hydrogenation beyond the menthone stage and, when used, must therefore be removed after hydrogenation to the menthone stage when it is desired to carry the hydrogenation to the menthol stage. However, the tendency towards racemisation is encountered mainly during hydrogenation to the menthone stage and precautions against racemisation are less necessary in the further hydrogenation to the menthol stage.

It may be advantageous to conduct the hydrogenation in stages, namely, first to carry the hydrogenation to the menthone stage and then to hydrogenate the product in a separate operation to the menthol stage. For this purpose the hydrogenation may be commenced in presence of a solvent of the kind above defined and continued until absorption of hydrogen ceases, the solvent then being removed and the hydrogenation continued.

We have found that the body hitherto regarded as pure laevo-piperitone is in fact a mixture of laevo-piperitone with the racemate of piperitone and in our U. S. Specification Serial No. 235,282 we have shown how there may be obtained from such a mixture pure or substantially pure laevo-piperitone having an optical rotation substantially higher than that hitherto regarded as the maximum for this body. Our discovery of the presence of the racemate of piperitone in the hitherto known laevo-piperitone reveals a further reason why the hydrogenation of this substance does not yield menthols of full optical activity.

The present invention permits the production of menthones and menthols having their full, or substantially full, optical activity from pure or substantially pure laevo-piperitone, that is to say, piperitone having an optical rotation of not less than about $$[\alpha]_D^{20} = -60°$$

By hydrogenating substantially pure laevo-piperitone under the conditions of this invention there can be obtained a mixture of dextro-neoisomenthol and laevo-neomenthol and from this mixture dextro-neoisomenthol and laevo-neomenthol having substantially their full optical activity may be isolated by any known method, for example, by the process described in U. S. Patent No. 1,932,131.

The dextro-neoisomenthol can be isomerised, for instance by a process similar to that described in U. S. Patents Nos. 1,811,711 and 1,811,777, to form a mixture of isomeric menthols containing the laevo-menthol corresponding with the naturally occurring substance. This operation should be conducted at a temperature lower than about 140° C. in order to avoid racemisation during the isomerisation. Preferably also there should be used for the isomerisation a hydrogenation catalyst fulfilling the conditions hereinbefore indicated, advantageously a catalyst containing some magnesium. From the mixture resulting from the isomerisation the substantially fully optically active laevo-menthol can be isolated by known methods, for instance, by the process of U. S. Patent No. 1,932,131.

The separation of dextro-neoisomenthol from laevo-neomenthol contained in the hydrogenation product prior to the isomerisation is important for the production of laevo-menthol of full or substantially full optical activity; this is because laevo-neomenthol corresponds in its asymmetry with dextro-menthol and yields this body on isomerisation, so that the isomerisation of the mixture of dextro-neoisomenthol and laevo-neomenthol would result in the formation of a certain quantity of inactive menthol.

It is to be understood that this form of the invention is not limited to the use of laevo-piperitone which has been obtained by the process of U. S. specification Serial No. 235,282 but is applicable to any substantially pure laevo-piperitone. Furthermore, the invention is not limited to any particular conditions of hydrogenation except such as avoid any appreciable racemisation during the hydrogenation.

The following examples illustrate the invention, the parts being by weight unless otherwise stated and the relationship between parts by weight and parts by volume being that which exist between the kilo and the litre.

*Example 1*

430 parts by volume of a solution of nickel nitrate containing 21 grams of nickel per 100 cc. and 100 parts by volume of a solution of chromium nitrate containing 10 grams of chromium per 100 cc. are mixed and evaporated to dryness and the resulting mixture of nitrates is ignited to the oxides by heating to about 350° C. The mixture of oxides is washed several times with distilled water until the wash water is no longer of a yellow colour (due to traces of sodium chromate) and has a pH value of 7.5. The washed oxides are dried on a steam plate and then reduced in a current of hydrogen at 290° C. for several hours. 10 parts of the catalyst thus prepared are added to a solution of 50 parts of laevo-piperitone (having an optical rotation $$[\alpha]_D^{20} = -65°)$$

in 100 parts of methylated spirit and the mixture is treated with hydrogen under a pressure of 100 lbs. per square inch and at a temperature of 100° C. until absorption of hydrogen ceases, which is the case when 1 molecular proportion of hydrogen has been absorbed.

The catalyst and methylated spirit are then removed and the resulting menthone is hydrogenated in the presence of a fresh catalyst prepared from a mixture of the carbonates of copper, nickel and magnesium containing the metals in the ratio of Cu:Ni:Mg=10:10:1 by first igniting the mixture to the corresponding mixture of oxides by heating in an open dish to 300°–350° C. washing the oxides with distilled water until the wash water has a pH value of not more than 10.0 (indicating the absence of free alkali), drying and finally reducing the oxides in a hydrogen atmosphere at 240° C. for several hours. The hydrogenation is allowed to proceed under a pressure of 100 lbs. per square inch and at a temperature of 100° C. until a further molecular proportion of hydrogen has been absorbed. The catalyst is then removed by filtration.

By treating the hydrogenation product with ortho-phosphoric acid in presence of petroleum ether according to the process described in U. S. Patent No. 1,932,131 there crystallises a phosphoric acid addition compound which when decomposed yields dextro-neoisomenthol, having the optical rotation $$[\alpha]_D^{20} = +1.5°$$

(homogeneous) and a specific gravity at 20° C. of 0.911.

The dextro-neoisomenthol thus obtained is then isomerised by the process described in U. S. Patents Nos. 1,811,711 and 1,811,777, at a temperature of 135°–140° in the presence of a copper-nickel-magnesium catalyst prepared in the manner above described. From the mixture of isomeric menthols so obtained, laevo-menthol having an optical rotation of $$[\alpha]_D^{20} = -50°$$

and a melting point of 42.5° C. is isolated by means of ortho-phosphoric acid according to the process of U. S. Patent No. 1,932,131.

*Example 2*

15 parts of a mixture of copper, nickel and magnesium carbonates containing the metals in the ratio Cu:Ni:Mg=10:10:1 are heated in an open pan to a temperature of 300°–350° C. until evolution of carbon dioxide ceases. The resulting mixture of oxides is washed with distilled water until the washings have a pH value of 10.0 and is then dried and reduced with hydrogen at 240° C. The catalyst thus prepared is added to a solution of 100 parts of laevo-piperitone $$([\alpha]_D^{20} = -66°)$$

in 200 parts of methanol of 94 per cent. strength and the whole is treated with hydrogen in an autoclave under a pressure of 100 lbs. per square inch and at a temperature of 25° C. until absorption of hydrogen ceases, which is the case when 1 molecular proportion of hydrogen has been absorbed. The liquid is separated from the catalyst and the methanol is then removed by distillation under reduced pressure. The menthone which remains is again mixed with the catalyst and hydrogenation is continued until a further molecular proportion of hydrogen has been absorbed.

The hydrogenation product is further treated as described in Example 1 for the isolation of dextro-neoisomenthol and for the production from this body of laevo-menthol.

*Example 3*

10 parts of "Mond" nickel are dissolved in an excess of nitric acid, the solution is evaporated to dryness and the residue is ignited to nickel oxide. The oxide is washed with distilled water until the washings are neutral, dried and reduced at 280°–300° C. with hydrogen.

100 parts of pure laevo-piperitone are hydrogenated in presence of the catalyst thus prepared under a hydrogen pressure of 100 lbs. per square inch and at a temperature of 100° C., absorption of hydrogen ceasing at the menthone stage. The menthone is separated by decantation and further hydrogenated and worked up to yield pure laevo-menthol as described in Example 1.

Having thus described the nature of the said invention and the best means I know of carrying the same into practical effect, I claim:

1. A process for converting laevo-piperitone in optically active hydrogenation products thereof without appreciable racemisation, which comprises hydrogenating the laevo-piperitone at a temperature below about 140° C. in the presence of a hydrogenation catalyst having a reaction corresponding with a pH-value between 5 and 10 as determined by extraction of the catalyst with water and measurement of the pH-value of the extract water.

2. A process for converting laevo-piperitone into optically active hydrogenation products thereof without appreciable racemisation, which comprises hydrogenating the laevo-piperitone at a temperature below about 140° C. in the presence of an organic solvent containing oxygen and having a dielectric constant of at least about 15 and in the presence of a hydrogenation catalyst having a reaction corresponding with a pH-value between 5 and 10 as determined by extraction of the catalyst with water and measurement of the pH-value of the extract water.

3. A process for converting laevo-piperitone into optically active menthones without appreciable racemisation, which comprises hydrogenating the laevo-piperitone at a temperature below about 140° C. in the presence of a hydrogenation catalyst having a reaction corresponding with a pH-value between 5 and 10 as determined by extraction of the catalyst with water and measurement of the pH-value of the extract water, the hydrogenation being discontinued when approximately two atoms of hydrogen have been absorbed per one molecule of piperitone.

4. A process for converting laevo-piperitone into optically active menthones without appreciable racemisation, which comprises hydrogenating the laevo-piperitone at a temperature below about 140° C. in the presence of an organic solvent containing oxygen and having a dielectric constant of at least about 15 and in the presence of a hydrogenation catalyst having a reaction corresponding with a pH-value between 5 and 10 as determined by extraction of the catalyst with water and measurement of the pH-value of the extract water, the hydrogenation being discontinued when approximately two atoms of hydrogen have been absorbed per one molecule of piperitone.

5. A process for converting laevo-piperitone into optically active menthols without appreciable racemisation, which comprises hydrogenating the laevo-piperitone at a temperature below about 140° C. until substantially no more hydrogen is absorbed in the presence of a hydrogenation catalyst having a reaction corresponding with a pH-value between 5 and 10 as determined by extraction of the catalyst with water and measurement of the pH-value of the extract water.

6. A process for converting laevo-piperitone into optically active menthols without appreciable racemisation, which comprises hydrogenating the laevo-piperitone at a temperature below about 140° C. in the presence of an organic solvent containing oxygen and having a dielectric constant of at least about 15 and in the presence of a hydrogenation catalyst having a reaction corresponding with a pH-value between 5 and 10 as determined by extraction of the catalyst with water and measurement of the pH-value of the extract water, the hydrogenation being discontinued when approximately two atoms of hydrogen have been absorbed per one molecule of piperitone, then removing the solvent and continuing the hydrogenation further in absence of the solvent until substantially no more hydrogen is absorbed.

7. A process for converting laevo-piperitone substantially free from piperitone racemate and having an optical rotation of not less than about $$[\alpha]_D^{20} = \text{minus } 60°$$

into optically active hydrogenation products thereof without appreciable racemisation, which comprises hydrogenating the laevo-piperitone at a temperature below about 140° C. in the presence of a hydrogenation catalyst having a reaction corresponding with a pH-value between 5 to 10 as determined by extraction of the catalyst with water and measurement of the pH-value of the extract water.

8. A process for converting laevo-piperitone substantially free from piperitone racemate and having an optical rotation of not less than about $$[\alpha]_D^{20} = \text{minus } 60°$$

into optically active hydrogenation products thereof without appreciable racemisation, which comprises hydrogenating the laevo-piperitone at a temperature below about 140° C. in the presence of an organic solvent containing oxygen and having a dielectric constant of at least about 15 and in the presence of a hydrogenation catalyst having a reaction corresponding with a pH-value between 5 and 10 as determined by extraction of the catalyst with water and measurement of the pH-value of the extract water.

9. A process for converting laevo-piperitone substantially free from piperitone racemate and having an optical rotation of not less than about $$[\alpha]_D^{20} = \text{minus } 60°$$

into optically active menthones without appreciable racemisation, which comprises hydrogenating the laevo-piperitone at a temperature below about 140° C. in the presence of a hydrogenation catalyst having a reaction corresponding with a pH-value between 5 and 10 as determined by extraction of the catalyst with water and measurement of the pH-value of the extract water, the hydrogenation being discontinued when approximately two atoms of hydrogen have been absorbed per one molecule of piperitone.

10. A process for converting laevo-piperitone substantially free from piperitone racemate and having an optical rotation of not less than about $$[\alpha]_D^{20} = \text{minus } 60°$$

into optically active menthones without appreciable racemisation, which comprises hydrogenating the laevo-piperitone at a temperature below about 140° C. in the presence of an organic solvent containing oxygen and having a dielectric constant of at least about 15 and in the presence of a hydrogenation catalyst having a reaction corresponding with a pH-value between 5 and 10 as determined by extraction of the catalyst with water and measurement of the pH-value of the extract water, the hydrogenation being discontinued when approximately two atoms of hydrogen have been absorbed per one molecule of piperitone.

11. A process for converting laevo-piperitone substantially free from piperitone racemate and having an optical rotation of not less than about $$[\alpha]_D^{20} = \text{minus } 60°$$

into optically active menthols without appreciable racemisation, which comprises hydrogenating the laevo-piperitone at a temperature below about 140° C. until substantially no more hydrogen is absorbed in the presence of a hydrogenation catalyst having a reaction corresponding with a pH-value between 5 and 10 as determined by extraction of the catalyst with water and measurement of the pH-value of the extract water.

12. A process for converting laevo-piperitone substantially free from piperitone racemate and having an optical rotation of not less than about $$[\alpha]_D^{20} = \text{minus } 60°$$

into optically active menthols without appreciable racemisation, which comprises hydrogenating the laevo-piperitone at a temperature below about 140° C. in the presence of an organic solvent containing oxygen and having a dielectric constant of at least about 15 and in the presence of a hydrogenation catalyst having a reaction corresponding with a pH-value between 5 and 10 as determined by extraction of the catalyst with water and measurement of the pH-value of the extract water, the hydrogenation being discontinued when approximately two atoms of hydrogen have been absorbed per one molecule of piperitone, then removing the solvent and continuing the hydrogenation further in absence of the solvent until substantially no more hydrogen is absorbed.

13. A process for converting laevo-piperitone substantially free from piperitone racemate and having an optical rotation of not less than about $$[\alpha]_D^{20} = \text{minus } 60°$$

into optically active menthols without appreciable racemisation, which comprises hydrogenating the laevo-piperitone at a temperature below about 140° C. until substantially no more hydrogen is absorbed in the presence of a hydrogenation catalyst having a reaction corresponding with a pH-value between 5 and 10 as determined by extraction of the catalyst with water and measurement of the pH-value of the extract water and isolating dextro-neoisomenthol from the product of the hydrogenation.

14. A process for converting laevo-piperitone substantially free from piperitone racemate and having an optical rotation of not less than about $$[\alpha]_D^{20} = \text{minus } 60°$$

into optically active menthols without appreciable racemisation, which comprises hydrogenating the laevo-piperitone at a temperature below about 140° C. in the presence of an organic solvent containing oxygen and having a dielectric constant of at least about 15 and in the presence of a hydrogenation catalyst having a reaction corresponding with a pH-value between 5 and 10 as determined by extraction of the catalyst with water and measurement of the pH-value of the extract water, the hydrogenation being discontinued when approximately two atoms of hydrogen have been absorbed per one molecule of piperitone, then removing the solvent and continuing the hydrogenation further in absence of the solvent until substantially no more hydrogen is absorbed and isolating dextro-neoisomenthol from the product of the hydrogenation.

15. A process for preparing laevo-menthol from laevo-piperitone substantially free from piperitone racemate and having an optical rotation of not less than about $$[\alpha]_D^{20} = \text{minus } 60°$$

which comprises hydrogenating the laevo-piperitone at a temperature below about 140° C. until substantially no more hydrogen is absorbed in the presence of a hydrogenation catalyst having a reaction corresponding with a pH-value between 5 and 10 as determined by extraction of the catalyst with water and measurement of the pH-value of the extract water, isolating dextro-neoisomenthol from the product of the hydrogenation, subjecting the dextro-neoisomenthol to isomerisation to produce an optically active mixture containing laevo-menthol and isolating laevo-menthol from this mixture.

16. A process for preparing laevo-menthol from laevo-piperitone substantially free from piperitone racemate and having an optical rotation of not less than about $$[\alpha]_D^{20} = \text{minus } 60°$$

which comprises hydrogenating the laevo-piperitone at a temperature below about 140° C. in the presence of an organic solvent containing oxygen and having a dielectric constant of at least about 15 in the presence of a hydrogenation catalyst having a reaction corresponding with a pH-value between 5 and 10 as determined by extraction of the catalyst with water and measurement of the pH-value of the extract water, the hydrogenation being discontinued when approximately two atoms of hydrogen have been absorbed per one molecule of piperitone, then removing the solvent and continuing the hydrogenation further in absence of the solvent until substantially no more hydrogen is absorbed, isolating dextro-neoisomenthol from the product of the hydrogenation, subjecting the dextro-neoisomenthol to isomerisation to produce an optically active mixture containing laevo-menthol and isolating laevo-menthol from this mixture.

17. A process for preparing laevo-menthol from laevo-piperitone substantially free from piperitone racemate and having an optical rotation of not less than about $$[\alpha]_D^{20} = \text{minus } 60°$$

which comprises hydrogenating the laevo-piperitone at a temperature below about 140° C. until substantially no more hydrogen is absorbed in the presence of a hydrogenation catalyst having a reaction corresponding with a pH-value between 5 and 10 as determined by extraction of the catalyst with water and measurement of the pH-value of the extract water, isolating dextro-neoisomenthol from the product of the hydrogenation, agitating the dextro-neoisomenthol in presence of a hydrogenating catalyst at a raised temperature below about 140° C., thereby forming an optically active mixture containing laevo-menthol, and isolating laevo-menthol from this mixture.

18. A process for preparing laevo-menthol from laevo-piperitone substantially free from piperitone racemate and having an optical rotation of not less than about $$[\alpha]_D^{20} = \text{minus } 60°$$

which comprises hydrogenating the laevo-piperitone at a temperature below about 140° C., in the presence of an organic solvent containing oxygen and having a dielectric constant of at least about 15 and in the presence of a hydrogenation catalyst having a reaction corresponding with a pH-value between 5 and 10 as determined by extraction of the catalyst with water and measurement of the pH-value of the extract water, the hydrogenation being discontinued when approximately two atoms of hydrogen have been absorbed per one molecule of piperitone, then removing the solvent and continuing the hydrogenation further in absence of the solvent until substantially no more hydrogen is absorbed, isolating dextro-neoisomenthol from the product of the hydrogenation, agitating the dextro-neoisomenthol in presence of a hydrogenating catalyst at a raised temperature below about 140° C., thereby forming an optically active mixture containing laevo-menthol, and isolating laevo-menthol from this mixture.

19. A process for preparing laevo-menthol from laevo-piperitone substantially free from piperitone racemate and having an optical rotation of not less than about $$[\alpha]_D^{20} = \text{minus } 60°$$

which comprises hydrogenating the laevo-piperitone at a temperature below about 140° C. until substantially no more hydrogen is absorbed in the presence of a hydrogenation catalyst having a reaction corresponding with a pH-value between 5 and 10 as determined by extraction of the catalyst with water and measurement of the pH-value of the extract water, reacting the hydrogenation product with ortho-phosphoric acid to form a phosphoric acid addition product of the dextro-neoisomenthol contained therein, isolating this phosphoric acid addition product, decomposing it to liberate dextro-neoisomenthol, agitating the dextro-neoisomenthol in presence of a hydrogenating catalyst at a raised temperature below about 140° C., thereby forming an optically active mixture containing laevo-menthol, reacting the mixture with ortho-phosphoric acid to form a phosphoric acid addition product of the laevo-menthol contained therein, isolating this phosphoric acid addition product, decomposing it to liberate laevo-menthol and recovering the liberated laevo-menthol.

20. A process for preparing laevo-menthol from laevo-piperitone substantially free from piperitone racemate and having an optical rotation of not less than about $$[\alpha]_D^{20} = \text{minus } 60°$$

which comprises hydrogenating the laevo-piperitone at a temperature below about 140° C. in the presence of an organic solvent containing oxygen and having a dielectric constant of at least about 15 and in the presence of a hydrogenation catalyst having a reaction corresponding with a pH-value between 5 and 10 as determined by extraction of the catalyst with water and measurement of the pH-value of the extract water, the hydrogenation being discontinued when approximately two atoms of hydrogen have been absorbed per one molecule of piperitone, then removing the solvent and continuing the hydrogenation further in absence of the solvent until substantially no more hydrogen is absorbed, reacting the hydrogenation product with ortho-phosphoric acid to form a phosphoric acid addition product of the dextro-neoisomenthol contained therein, isolating this phosphoric acid addition product, decomposing it to liberate dextro-neoisomenthol, agitating the dextro-neoisomenthol in presence of a hydrogenating catalyst at a raised temperature below about 140° C., thereby forming an optically active mixture containing laevo-menthol, reacting this mixture with ortho-phosphoric acid to form a phosphoric acid addition product of the laevo-menthol contained therein, isolating this phosphoric acid addition product, decomposing it to liberate laevo-menthol and recovering the liberated laevo-menthol.

JOHN WILLIAM BLAGDEN.
WALTER EDWARD HUGGETT,